US008970560B2

(12) United States Patent  
Keda et al.

(10) Patent No.: US 8,970,560 B2  
(45) Date of Patent: Mar. 3, 2015

(54) WRITING INSTRUMENT

(71) Applicant: Kotobuki & Co., Ltd., Saitama (JP)

(72) Inventors: Tadashi Keda, Saitama (JP); Sachio Arai, Saitama (JP); Hidehei Kageyama, Saitama (JP)

(73) Assignee: Kotobuki & Co., Ltd., Kawagoe, Saitama (JP)

( * ) Notice: Subject to any disclaimer, the term of this patent is extended or adjusted under 35 U.S.C. 154(b) by 50 days.

(21) Appl. No.: 13/889,174

(22) Filed: May 7, 2013

(65) Prior Publication Data

US 2013/0300693 A1 Nov. 14, 2013

(30) Foreign Application Priority Data

May 8, 2012 (JP) ................................. 2012-107132  
May 2, 2013 (JP) ................................. 2013-096869

(51) Int. Cl.
*G06F 3/033* (2013.01)  
*G06F 3/0354* (2013.01)  
*B43K 23/12* (2006.01)  
*B43K 24/08* (2006.01)  
*B43K 29/02* (2006.01)  
*B43K 29/08* (2006.01)  
*B43K 29/20* (2006.01)

(52) U.S. Cl.
CPC ............ *G06F 3/03545* (2013.01); *B43K 23/12* (2013.01); *B43K 24/08* (2013.01); *B43K 29/02* (2013.01); *B43K 29/08* (2013.01); *B43K 29/20* (2013.01)  
USPC ............................. 345/179; 345/183; 401/195

(58) Field of Classification Search
CPC ......... G06F 3/03; G06F 3/033; G06F 3/0321; G06F 3/0354  
USPC .................... 345/173–183; 178/18.01–18.07, 178/19.01–19.07; 401/195–202  
See application file for complete search history.

(56) References Cited

U.S. PATENT DOCUMENTS 4,979,254 A 12/1990 Naujock  
6,261,018 B1 * 7/2001 Chen ............................. 401/195

(Continued)

FOREIGN PATENT DOCUMENTS

DE 20 2006 019 2 U1 4/2007  
JP 58-175979 11/1983

(Continued)

OTHER PUBLICATIONS

European Search Report dated Aug. 8, 2013.

*Primary Examiner* — Vijay Shankar  
(74) *Attorney, Agent, or Firm* — McGinn IP Law Group, PLLC

(57) ABSTRACT

A writing instrument includes a cylindrical barrel and an end cover having a robust structure and attached to the cylindrical barrel. The end cover includes a cylindrical base attached to a rear end portion of the cylindrical barrel, a cover body fitted around an outer peripheral surface of the cylindrical base, a stopper ring fitted around an outer peripheral surface of at least a fitted portion between the cylindrical base and the cover body, and a cooperation structure for enhancing a holding force which is exerted on the cover body by the cylindrical base and the stopper ring and for joining the cylindrical base, the cover body, and the stopper ring together to form a joined unit which includes the cylindrical base, the cover body and the stopper ring.

20 Claims, 7 Drawing Sheets

(56) References Cited

U.S. PATENT DOCUMENTS

| | | |
|---|---|---|
| 6,309,129 B1 | 10/2001 | Kageyama et al. |
| 6,604,880 B1 * | 8/2003 | Huang et al. .................. 401/195 |
| 7,314,325 B2 * | 1/2008 | Chang et al. .................. 401/195 |
| 8,118,510 B1 | 2/2012 | Kamhi |
| 2004/0213627 A1 | 10/2004 | Marschand et al. |
| 2005/0100387 A1 | 5/2005 | Odaka |

FOREIGN PATENT DOCUMENTS

| | | |
|---|---|---|
| JP | 11-314491 A | 11/1999 |
| JP | 2005-161829 A | 6/2005 |
| JP | 3173117 | 1/2012 |

\* cited by examiner

WRITING INSTRUMENT

TECHNICAL FIELD

The present invention relates to a writing instrument which includes a cylindrical barrel and an end cover attached to an end portion of the cylindrical barrel and having a function of providing decorativeness to the writing instrument, or functioning as an eraser cover and/or a pen tip of a touch pen.

BACKGROUND ART

In the past, there was known a writing instrument which includes a cylindrical barrel and an end cover mounted to a rear end portion of the cylindrical barrel and provided with a three-dimensionally shaped object which imitates any doll, animal, character, or the like and provides decorativeness to the writing instrument.

Moreover, there was known a writing instrument which includes a cylindrical barrel and an end cover detachably attached to a rear end portion of the cylindrical barrel and serving as an eraser cover for covering an eraser mounted in the rear end portion of the cylindrical barrel via an eraser holder (Patent Literature 1).

Moreover, there was known a writing instrument which is also usable as a touch pen for an electronic appliance, such as a word processor and a computer, and includes a pen tip of the touch pen, that is provided at a rear end of a cylindrical barrel, as well as a writing element provided at a front end of the cylindrical barrel (Patent Literature 2). As material for this type of pen tip, there is typically employed electrically conductive elastic material such as electrically conductive plastic material, electrically conductive rubber, or electrically conductive sponge (Patent Literature 3).

CITATION LIST

Patent Literature

Patent Literature 1: JP-A No. 2005-161829
Patent Literature 2: JU-A No. 58-175979
Patent Literature 3: JU Reg. No. 3173117

SUMMARY OF THE INVENTION

Technical Problem

In the writing instrument which has the end cover provided with the three-dimensionally shaped object, the end cover is required to have a robust structure, since the end cover is provided with the three-dimensionally shaped object.

Moreover, in the writing instrument disclosed in the Patent Literature 1, the end cover is also required to have a robust structure in order to protect the eraser.

Moreover, if the end cover can be used as a pen tip of a touch pen which is to be touched on a touch panel of an electronic appliance, the end cover is very convenient. Even in this case, the end cover is also required to have a robust structure.

Therefore, it is an object of the present invention to provide a writing instrument, to an end portion of a cylindrical barrel of which an end cover having a robust structure is attached.

Solution to Problem

In accordance with the present invention, there is provided a writing instrument which comprises a cylindrical barrel and an end cover attached to a rear end portion of the cylindrical barrel, wherein the end cover comprises a cylindrical base mounted around the rear end portion of the cylindrical barrel, a cover body fitted around an outer peripheral surface of a rear end portion of the cylindrical base, a stopper ring fitted around an outer peripheral surface of at least a fitted portion between the cylindrical base and the cover body, and a cooperation structure for enhancing a holding force which is exerted on the cover body by the cylindrical base and the stopper ring and for joining the cylindrical base, the cover body, and the stopper ring together to form a joined unit which comprises the cylindrical base, the cover body and the stopper ring.

According to the present invention, the cooperation structure for enhancing the holding force is provided at the end cover, so that it is possible to provide the end cover having a robust structure in which the cylindrical base, the cover body, and the stopper ring are joined together via the cooperation structure.

According to a first embodiment of the writing instrument according to the present invention, the cooperation structure comprises an outward facing flange protruding radially outward from a front end portion of the cover body, a first step portion extending radially outward from an outer peripheral surface of a substantially middle portion of the cylindrical base in an axial direction of the cylindrical base, an engagement portion protruding radially inward from a rear end portion of the stopper ring, and a second step portion extending radially outward from an outer peripheral surface of a portion of the cylindrical base in front of the first step portion, the cover body being fitted around the outer peripheral surface of the rear end portion of the cylindrical base with the outward facing flange being engagedly stopped by the first step portion, and the stopper ring being fitted around an outer peripheral surface of at least a fitted portion between the cylindrical base and the cover body with a front end surface thereof being engagedly stopped by the second step portion, and with the engagement portion being engagedly stopped by a rear end surface of the outward facing flange and engaged with an outer peripheral surface of the cover body.

In this embodiment, the cover body is fitted around the outer peripheral surface of the rear end portion of the cylindrical base with the outward facing flange being engagedly stopped by the first step portion, and the stopper ring is fitted around the outer peripheral surface of the at least fitted portion between the cylindrical base and the cover body with the front end surface thereof being engagedly stopped by the second step portion, and with the engagement portion being engagedly stopped by the rear end surface of the outward facing flange and engaged with the outer peripheral surface of the cover body, so that the cover body is tightly and strongly held by the cylindrical base and the stopper ring. Moreover, the flange which is provided at the cover body protrudes radially outward, so that a large space can be provided in an interior of the cover body.

In the first embodiment, the cooperation structure may further include a third step portion extending radially outward from an outer peripheral surface of a portion of the cover body in rear of the outward facing flange and defining a recessed portion in cooperation with the outward facing flange. The cover body is fitted around the outer peripheral surface of the rear end portion of the cylindrical base with the outward facing flange being engagedly stopped by the first step portion. The stopper ring is fitted around the outer peripheral surface of the at least fitted portion between the cylindrical base and the cover body with the front end surface thereof being engagedly stopped by the second step portion, and with the engagement portion being engagedly fitted in the recessed portion.

In this case, the cover body is fitted around the outer peripheral surface of the rear end portion of the cylindrical base with the outward facing flange being engagedly stopped by the first step portion and the stopper ring is fitted around the outer peripheral surface of the at least fitted portion between the cylindrical base and the cover body with the front end surface thereof being engagedly stopped by the second step portion, and with the engagement portion being engagedly fitted in the recessed portion, so that the holding force which is exerted on the cover body in a radial direction and a direction oblique to an axial direction by the cylindrical base and the stopper ring can be more enhanced.

According to a second embodiment of the writing instrument of the present invention, the cooperation structure comprises a first step portion extending radially outward from an outer peripheral surface of a substantially middle portion of the cylindrical base in an axial direction of the cylindrical base, a recessed portion formed around an outer peripheral surface of a portion of the cylindrical base in rear of the first step portion, a second step portion extending radially outward from an outer peripheral surface of a portion of the cylindrical base in front of the first step portion, and an inward facing flange protruding radially inward from an inner peripheral surface of a portion of the cover body which positionally corresponds to the recessed portion. The cover body is fitted around the outer peripheral surface of the rear end portion of the cylindrical base with a front end surface thereof being engagedly stopped by the first step portion, and with the inward facing flange being engagedly fitted in the recessed portion. The stopper ring is fitted around an outer peripheral surface of at least a fitted portion between the cylindrical base and the cover body with a front end surface thereof being engagedly stopped by the second step portion.

In the second embodiment, the cover body is fitted around the outer peripheral surface of the rear end portion of the cylindrical base with the front end surface thereof being engagedly stopped by the first step portion, and with the inward facing flange being engagedly fitted in the recessed portion, and the stopper ring is fitted around the outer peripheral surface of the at least fitted portion between the cylindrical base and the cover body with the front end surface thereof being engagedly stopped by the second step portion, so that the cover body is tightly and strongly held by the cylindrical base and the stopper ring.

In the second embodiment, the cooperation structure may further include an engagement portion protruding radially inward from a rear end portion of the stopper ring, and a second recessed portion formed around an outer peripheral surface of a portion of the cover body which positionally corresponds to the engagement portion. The cover body is fitted around the outer peripheral surface of the rear end portion of the cylindrical base with the front end surface thereof being engagedly stopped by the first step portion, and with the inward facing flange being engagedly fitted in the first recessed portion. The stopper ring is fitted around the outer peripheral surface of the at least fitted portion between the cylindrical base and the cover body with the front end surface thereof being engagedly stopped by the second step portion, and with the engagement portion being engagedly fitted in the second recessed portion.

As discussed above, the cover body is fitted around the outer peripheral surface of the rear end portion of the cylindrical base with the front end surface thereof being engagedly stopped by the first step portion, and with the inward facing flange being engagedly fitted in the first recessed portion, and the stopper ring is fitted around the outer peripheral surface of the at least fitted portion between the cylindrical base and the cover body with the front end surface thereof being engagedly stopped by the second step portion, and with the engagement portion being engagedly fitted in the second recessed portion, so that the cover body is more tightly and strongly held by the cylindrical base and the stopper ring.

In each of the first and second embodiments, the cylindrical base, the cover body, and the stopper ring may be configured so as to be flush with one another in outer peripheries thereof. According to this structure, it is possible to provide an end cover having a good visual appearance and, therefore, to enhance commercial value of the writing instrument.

In each of the first and second embodiments, an interval between the cylindrical base and the stopper ring may be made narrower than a thickness of a peripheral wall portion of the cover body. According to this structure, the cover body is tightly and strongly held by the cylindrical base and the stopper ring, so that the holding force which is exerted on the cover body by the cylindrical base and stopper ring can be more enhanced.

In each of the first and second embodiments, a knurling may be provided around the outer peripheral surface of the cylindrical base. According to this structure, the cover body can be whirl-stopped relative to the cylindrical base via the knurling.

In each of the first and second embodiments, the writing instrument may further include an eraser holder holding an eraser and the rear end portion of the cylindrical barrel may be opened. In this case, the eraser holder is fitted in the open rear end portion of the cylindrical barrel, and the end cover is removably attached to the open rear end portion of the cylindrical barrel in a state where it covers the eraser held by the eraser holder. Therefore, according to this structure, it is possible to provide the end cover which serves as an eraser cover.

In each of the first and second embodiments, the cylindrical base and the stopper ring may be formed of electrically conductive hard material, and the cover body may be formed of electrically conductive elastic material. According to this structure, the cover body is configured so as to be usable as a pen tip of a touch pen, so that it is possible to provide the writing instrument which has multi-functions.

DETAILED DESCRIPTION OF EMBODIMENTS

The present invention will be explained in detail hereinafter with reference to the accompanying drawings which illustrate non-limiting embodiments of the present invention. Incidentally, it is to be noted that, terms "front end" and terms "rear end" are hereinafter referred to based on "an end portion of a cylindrical barrel of a writing instrument from which a writing tip of a writing element received in the cylindrical barrel is projected", and "an end portion of the cylindrical barrel on the side opposite to the end portion of the cylindrical barrel from which the writing tip of the writing element is projected", respectively.

First Embodiment

Figure 1:
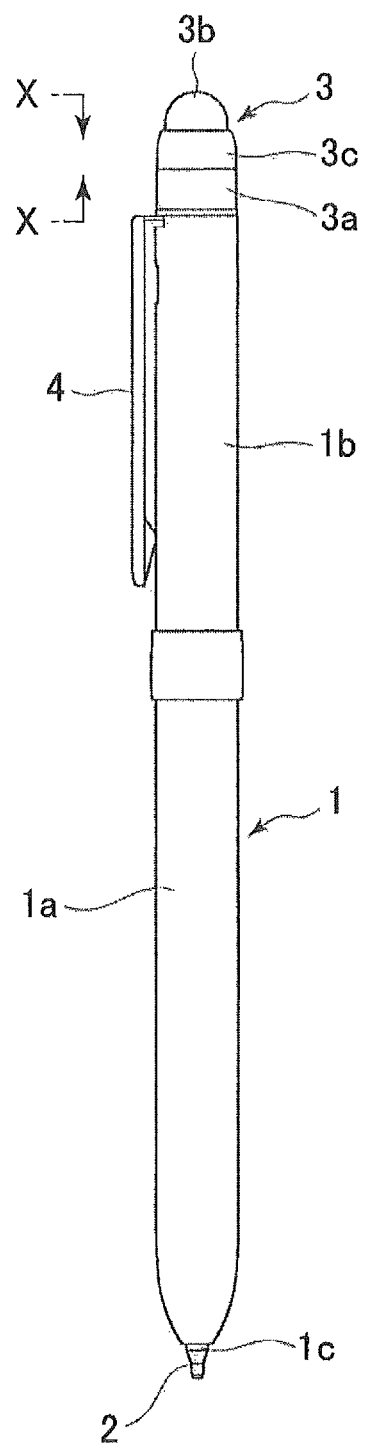
FIG. 1 is a view illustrating an entire writing instrument to which the present invention is applied.

Referring to FIG. 1, there is illustrated a writing instrument to which the present invention is applied. The writing instrument includes a cylindrical barrel 1 which comprises a front cylindrical barrel member 1a and a rear cylindrical barrel member 1b connected to the front cylindrical barrel member 1a. The front cylindrical barrel member 1a is formed at a tip end thereof with an opening 1c from which a writing tip 2 of a writing element slidably received in the cylindrical barrel 1 is retractably projected. While the cylindrical barrel 1 is composed of two parts, or the front cylindrical barrel member 1a and the rear cylindrical barrel member 1b in the writing instrument shown in FIG. 1, the cylindrical barrel 1 may be composed of a single cylindrical barrel member. Incidentally, reference sign 4 in FIG. 1 denotes a clip. As the writing element, there may be employed, for example, a refill for a ball-point pen, a refill for a mechanical pencil, a refill for a felt pen, etc.

An end cover 3 is provided at a rear end portion of the rear cylindrical barrel member 1b. As the end cover 3, there may be employed an end cover with a three-dimensionally shaped object that imitates any doll, animal, character, or the like and provides decorativeness to the writing instrument, an end cover for covering an eraser that is provided in the rear end portion of the rear cylindrical barrel member 1b via an eraser holder, an end cover usable as a pen tip of a touch pen which is to be touched on a touch panel of an electronic appliance, and an end cover usable as both the eraser cover and the pen tip of the touch pen.

Figure 2:
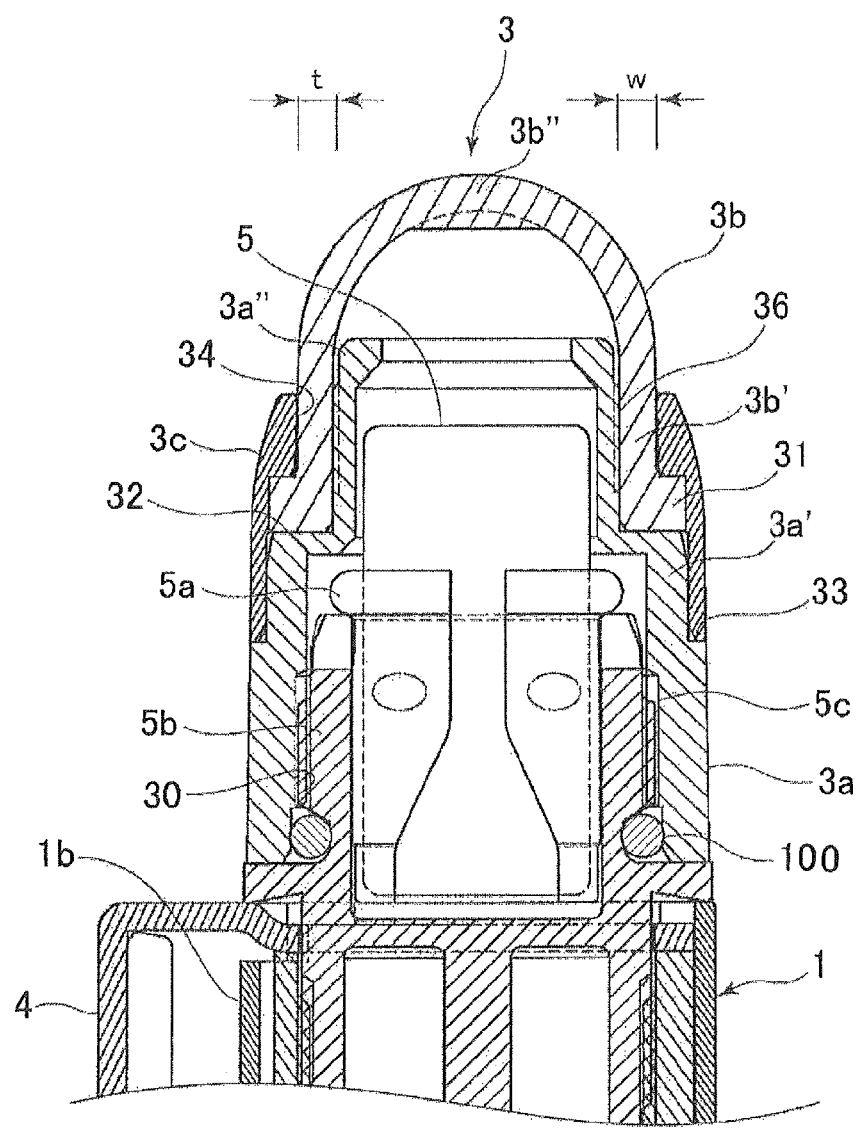
FIG. 2 is an enlarged sectional view which shows a portion of a first embodiment of the writing instrument shown in FIG. 1, taken along a line X-X in FIG. 1.

Referring to FIG. 2, the end cover 3 of the writing instrument according to the first embodiment comprises a cylindrical base 3a mounted around the rear end portion of the rear cylindrical barrel member 1b of the cylindrical barrel 1, a cover body 3b fitted around an outer peripheral surface of a rear end portion of the cylindrical base 3a, a stopper ring 3c fitted around an outer peripheral surface of at least a fitted portion between the cylindrical base 3a and the cover body 3b, and a cooperation structure for enhancing a holding force which is exerted on the cover body 3b by the cylindrical base 3a and the stopper ring 3c and for joining the cylindrical base 3a, the cover body 3b, and the stopper ring 3c together to form a joined unit which comprises the cylindrical base 3a, the cover body 3b, and the stopper ring 3c. Thus, the end cover 3 can be configured so as to have a robust structure in which the cylindrical base 3a, the cover body 3b, and the stopper ring 3c are joined together to form the joined unit. The end cover 3 in which the cylindrical base 3a, the cover body 3b, and the stopper ring 3c form the joined unit in this way is attached with respect to the cylindrical barrel 1 by causing the cylindrical base 3a to be mounted around the rear end portion of the rear cylindrical barrel member 1b.

The cylindrical base 3a comprises a large diameter tubular portion 3a' of fitted around the outer peripheral surface of the rear end portion of the rear cylindrical barrel member 1b, and a small diameter tubular portion 3a" smaller in diameter than the large diameter tubular portion 3a and continuously extending rearward from a rear end of the large diameter tubular portion 3a'. An outer peripheral surface of a substantially middle portion of the cylindrical base 3a, namely, an outer peripheral surface of the rear end portion of the large diameter tubular portion 3a' constitutes a first annular step portion 32 which extends radially outward. Moreover, the large diameter tubular portion 3a' further has a second annular step portion 33 extending radially outward from a region of the large diameter tubular portion 3a' which is adjacent to a front end of the large diameter tubular portion 3a' relative to the first step portion 32.

The cover body 3b comprises a peripheral wall portion 3b' of a substantially cylindrical shape fitted around an outer peripheral surface of the small diameter tubular portion 3a" of the cylindrical base 3a, a ceiling portion 3b''' formed in a dome shape at a rear end of the peripheral wall portion 3b', and an outward facing flange 31 protruding radially outwardly from a front end portion of the peripheral wall portion 3b'. The outward facing flange 31 is formed as an annular flange continuously extending around a periphery of the peripheral wall portion 3b'.

The stopper ring 3c is an annular component, an outer diameter of a rear end portion of which is reduced. Moreover, an inner diameter of a region extending from a front end toward the rear end portion of the stopper ring 3c is substantially constant and the rear end portion of the stopper ring 3c is formed in a step form, to thereby form an annular engagement portion 34 extending radially inward, so that an inner diameter of the rear end portion of the stopper ring 3c is reduced.

In a case where the end cover 3 is used as an end cover with a three-dimensionally shaped object, which imitates any doll, animal, character, or the like and provides decorativeness to the writing instrument, and/or as an eraser cover, and no consideration is paid to the use of the end cover as the pen tip of the touch pen, the cover body 3b may be formed of elastic material such as rubber or sponge and the cylindrical base 3a and the stopper ring 3c may be formed of plastic material or metal material.

In the case where the end cover 3 is used as the pen tip of the touch pen, the cover body 3b may be formed of electrically conductive elastic material, such as electrically conductive elastic polymer compound (for example, electrically conductive silicone rubber), electrically conductive rubber, or electrically conductive sponge. In this case, the cylindrical base 3a and the stopper ring 3c may be formed of metal material, such as copper alloy (for example, brass) or ferro-alloy (for example, stainless), or electrically conductive hard plastic material. The cylindrical barrel 1 may be formed of electrically conductive material such as metal material or electrically conductive hard plastic material. Moreover, the cylindrical barrel 1 may be formed of a material which comprises two layers, namely, an inner layer of plastic material or metal-plated plastic material and an outer layer of metal material positioned on an outer surface of the inner layer.

In the embodiment shown in FIG. 2, the outward facing flange 31, the first step portion 32, the second step portion 33 and the engagement portion 34 constitute the above-mentioned cooperation structure.

The cover body 3b is fitted around the outer peripheral surface of the rear end portion of the cylindrical base 3a with a front surface of the outward facing flange 31 thereof being engagedly stopped by the first step portion 32, and with an inner peripheral surface of the peripheral wall portion 3b' being engaged with the outer peripheral surface of the small diameter tubular portion 3a" of the cylindrical base 3a. Moreover, the stopper ring 3c is fitted around the outer peripheral surface of the at least fitted portion between the cylindrical base 3a and the cover body 3b with a front end surface thereof being engagedly stopped by the second step portion 33, and with the engagement portion 34 being engagedly stopped by a rear end surface of the outward facing flange 31 and engaged with the outer peripheral surface of the peripheral wall portion 3b' of the cover body 3b. Thus, the cover body 3b, the cylindrical base 3a, and the stopper ring 3c are joined together to form the joined unit as discussed above.

In the first embodiment configured as discussed above, the holding force which is exerted on the cover body 3b by the cylindrical base 3a and the stopper ring 3c is enhanced by the cooperation structure. Therefore, the end cover 3 according to this embodiment is configured as an end cover in which the cover body 3b, the cylindrical base 3a, and the stopper ring 3c are joined together and which has a robust structure. Particularly, in the case where the cover body 3b is formed of elastic material, the cover body 3b can be strongly held by the cylindrical base 3a and the stopper ring 3c via the cooperation structure. Of course in the case where the end cover 3 is used as the eraser cover and even in the case where the end cover 3 is used as the pen tip of the touch pen in which the cover body 3b is formed of electrically conductive elastic material, there is no possibility that the cover body 3b will be accidentally removed from the cylindrical base 3a and the stopper ring 3c.

In the case where the end cover 3 is used as the eraser cover, an eraser holder 5a which holds an eraser 5 is fitted in the rear end portion of the rear cylindrical barrel member 1b which is configured as an eraser holder receiving portion 5b. In the embodiment shown in FIG. 2, the flange 31 which is one of the elements of the cooperation structure is provided on the cover body 3b so as to protrude radially outwardly, so that a large space for the eraser 5 having a large diameter can be provided in an interior of the cover body 3b.

In the case where the end cover 3 is used as the eraser cover, the end cover 3 is required to be removed from the cylindrical barrel 1 whenever the eraser 5 is to be used. Therefore, for example, if a thread 5c and a thread 30 which are engaged with each other are provided around the outer peripheral surface of the rear cylindrical barrel member 1b of the cylindrical barrel 1 and the inner peripheral surface of the front end portion of the cylindrical base 3a, respectively, the end cover 3 having the cover body 3b, the cylindrical base 3a, and the stopper ring 3c joined together as discussed above can be detachably threadedly-mounted with respect to the rear end portion of the rear cylindrical barrel member 1b of the cylindrical barrel 1 via the threads 5c, 30. Incidentally, in the case where the end cover 3 is not used as the eraser cover, the end cover 3 may be undetachably fixed to the rear cylindrical barrel member 1b of the cylindrical barrel 1. Reference sign 100 in FIG. 2 designates an O-ring.

Again referring to FIG. 2, an interval w between the outer peripheral surface of the small diameter tubular portion 3a" of the cylindrical base 3a and the inner peripheral surface of the engagement portion 34 of the stopper ring 3c may be made narrower than a thickness t of the peripheral wall portion 3b' of the cover body 3b. In this case, the cover body 3b can be more tightly and strongly held by the cylindrical base 3a and the stopper ring 3c.

Incidentally, while an interval between the outer peripheral surface of the small diameter tubular portion 3a" of the cylindrical base 3a and an inner peripheral surface of a portion of the stopper ring 3c which extends forward from the engagement portion 34 is set to be substantially equal to a protruding width of the outward facing flange 31 protruding radially outwardly in the first embodiment, the interval may be set to be narrower than the protruding width of the outward facing flange 31. Moreover, while an interval between the first step portion 32 of the cylindrical base 3a and a front end surface of the engagement portion 34 of the stopper ring 3c which is substantially parallel to the first step portion 32 is set to be substantially equal to a thickness of the outward facing flange 31 in the first embodiment, the interval may be set to be narrower than the thickness of the outward facing flange 31.

Moreover, a knurling 36 may be provided around the outer peripheral surface of the small diameter tubular portion 3a" of the cylindrical base 3a. In this case, the cover body 3b is whirl-stopped relative to the cylindrical base 3a via the knurling 36, so that the cover body 3b can be kept in a state where the cover body 3b is stably fitted around the rear end portion of the cylindrical base 3a.

Modification of First Embodiment

Figure 3:
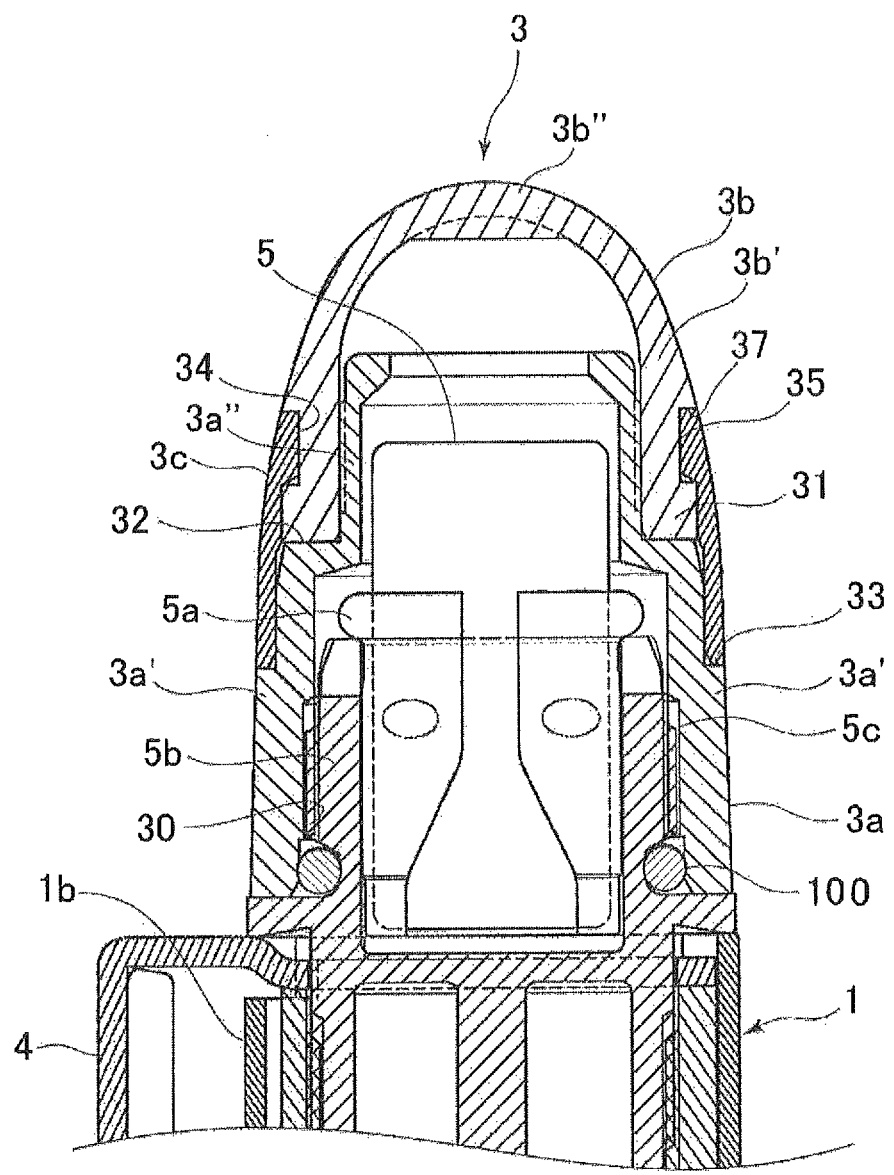
FIG. 3 is an enlarged sectional view illustrating a modification of the first embodiment of FIG. 2.

Referring to FIG. 3, there is illustrated a modification of the first embodiment shown in FIG. 2. This modification is configured in a substantially similar manner as the first embodiment of FIG. 2 is done, except that the cooperation structure of this modification further includes a third step portion 37 which extends radially outward from a region of the outer peripheral surface of the peripheral wall portion 3b' in the rear of the outward facing flange 31 and defines a recess portion 35 in cooperation with the outward facing flange 31. Therefore, elements of the modification shown in FIG. 3 which are similar or identical to those of the first embodiment shown in FIG. 2 are denoted by like reference signs and the description of them will not be repeated.

As discussed above, the third step portion 37 is formed on the region of the outer peripheral surface of the peripheral wall portion 3b' in the rear of the outward facing flange 31. An outward protruding width of the third step portion 37 which is measured in a radial direction is set to be substantially equal to the thickness of the rear end surface of the stopper ring 3c. In the modification shown in FIG. 3, the third step portion 37 as well as the outward facing flange 31, the first step portion 32, the engagement portion 34, and the second step portion 33 constitute the elements of the cooperation structure.

In the modification shown in FIG. 3, the cover body 3b is fitted around the outer peripheral surface of the rear end portion of the cylindrical base 3a with the front end surface of the outward facing flange 31 being engagedly stopped by the first step portion 32 and with the inner peripheral surface of the peripheral wall portion 3b' being engaged with the outer peripheral surface of the small diameter tubular portion 3a" of the cylindrical base 3a. Moreover, the stopper ring 3c is fitted around the outer peripheral surface of the at least fitted portion between the cylindrical base 3a and the cover body 3b with the front end surface thereof being engagedly stopped by the second step portion 33 and with the engagement portion 34 being engagedly fitted in the recess portion 35. Thus, the cover body 3b, the cylindrical base 3a, and the stopper ring 3c are joined together, whereby the cover body 3b can be strongly held by the cylindrical base 3a and the stopper ring 3c via the cooperation structure. Moreover, the engagement portion 34 of the stopper ring 3c is engagedly fitted in the recess portion 35 of the cover body 3b, so that the holding force which is exerted on the cover body 3b in a radial direction and a direction oblique to an axial direction by the cylindrical base 3a and the stopper ring 3c can be more enhanced.

Moreover, as shown in FIG. 3, the outer peripheral surface of the cover body 3b, the outer peripheral surface of the stopper ring 3c, and the outer peripheral surface of the cylindrical base 3a are configured so as to be flush with one another, thus making it possible to provide an end cover having a good visual appearance and, therefore, to enhance commercial value of the writing instrument.

Moreover, the engagement portion 34 of the stopper ring 3c is engagedly fitted in the recess portion 35 of the cover body 3b and the third step portion 37 extending in the radial direction of the cover body 3c is engagedly stopped by the rear end surface of the engagement portion 34 of the stopper ring 3c, so that particularly in the case where the cover body 3b is formed of elastic material, it is possible to suppress deformation of the cover body 3b which may be brought about by repeated use of the cover body. For example, in the case where the cover body 3b is formed of electrically conductive elastic material in order that the end cover 3 can be used as the pen tip of the touch pen, even if the cover body 3b is touched on a touch panel of an electronic appliance a great number of times, the deformation of the cover body 3b can be suppressed.

Second Embodiment

Figure 4:
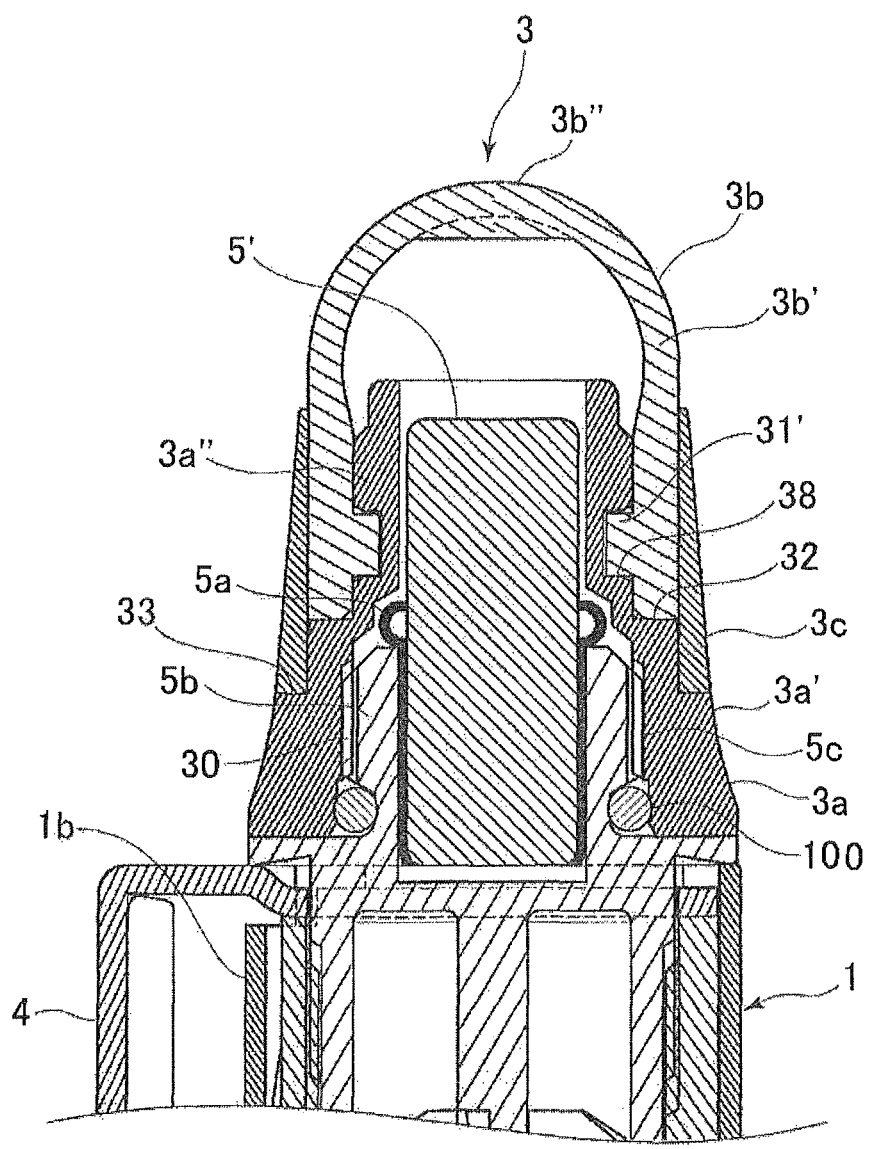
FIG. 4 is an enlarged sectional view which is similar to FIG. 2 and illustrates a second embodiment of the present invention.

Referring to FIG. 4, there is illustrated a second embodiment of the present invention. This embodiment is an example which is applied, for example, to a case where the end cover 3 is used as both the eraser cover covering a small-diameter eraser 5' and the pen tip of the touch pen, namely, a case where a large space for the eraser 5 is not required to be provided in the interior of the cover body 3b. More particularly, the second embodiment shown in FIG. 4 is different from the first embodiment shown in FIG. 2 in that the cooperation structure includes an annularly recessed portion 38 formed in a region of the outer peripheral surface of the cylindrical base 3a in the rear of the first step portion 32, and an inward facing flange 31' employed in lieu of the outward facing flange 31, the inward facing flange 31' projecting radially inward from a region of the inner peripheral surface of the cover body 3b which positionally corresponds to the recess portion 38 of the cylindrical base 3a, and the stopper ring 3c does not have the engagement portion 34. Other elements of the second embodiment shown in FIG. 4 are configured in the substantially same manner as those of the embodiment shown in FIG. 2 are done. Therefore, elements of the embodiment shown in FIG. 4 which are similar or identical to those of the first embodiment shown in FIG. 2 are denoted by like reference signs and the description of them will not be repeated.

The annularly recessed portion 38 is formed so as to continuously extend around the region of the outer peripheral surface of the cylindrical base 3a in the rear of the first step portion 32, namely, around the outer peripheral surface of the small diameter tubular portion 3a" of the cylindrical base 3a. Moreover, the inward facing flange 31' which protrudes radially inward is formed around the inner peripheral surface of the peripheral wall portion 3b' of the cover body 3b. More particularly, the inward facing flange 31' is formed as an annular flange which continuously extends around the inner peripheral surface of the peripheral wall portion 3b' of the cover body 3b. The recess portion 38 and the inward facing flange 31' have complementary shapes which allow them to be engaged with each other.

Incidentally, while a depth of the recessed portion 38 which is measured in the radial direction of the recessed portion 38 is set so as to be substantially equal to a protruding width of the inward facing flange 31' projecting radially inward in the second embodiment, the depth of the recessed portion 38 may be set so as to become shallower than the protruding width of the inward facing flange 31'. Moreover, while a length of the recessed portion 38 that is measured in a forward and rearward direction of the recessed portion 38 is set so as to be substantially equal to a thickness of the inward facing flange 31' that is measured in a forward and rearward direction of the inward facing flange 31' in the second embodiment, the length of the recessed portion 38 may be set so as to become shorter than the thickness of the inward facing flange 31'.

In the second embodiment shown in FIG. 4, the recessed portion 38, the inward facing flange 31', the first step portion 32, and the second step portion 33 constitute the cooperation structure.

In the second embodiment, the cover body 3b is fitted around the outer peripheral surface of the small diameter tubular portion 3a" of the cylindrical base 3a with the front end surface of the peripheral wall portion 3b' thereof being engagedly stopped by the first step portion 32 and with the inward facing flange 31' being engagedly fitted in the recessed portion 38. Moreover, the stopper ring 3c is fitted around the outer peripheral surface of the at least fitted portion between the cylindrical base 3a and the cover body 3b with the front end surface thereof being engagedly stopped by the second step portion 33 and with the inner peripheral surface thereof being engaged with the outer peripheral surface of the peripheral wall portion 3b' of the cover body 3b and the outer peripheral surface of the large diameter tubular portion 3a' of the cylindrical base 3a. Thus, the cover body 3b, the cylindrical base 3a, and the stopper ring 3c are joined together to form a joined unit, so that the cover body 3b can be strongly held by the cylindrical base 3a and the stopper ring 3c via the cooperation structure.

Modification of Second Embodiment

Figure 5:
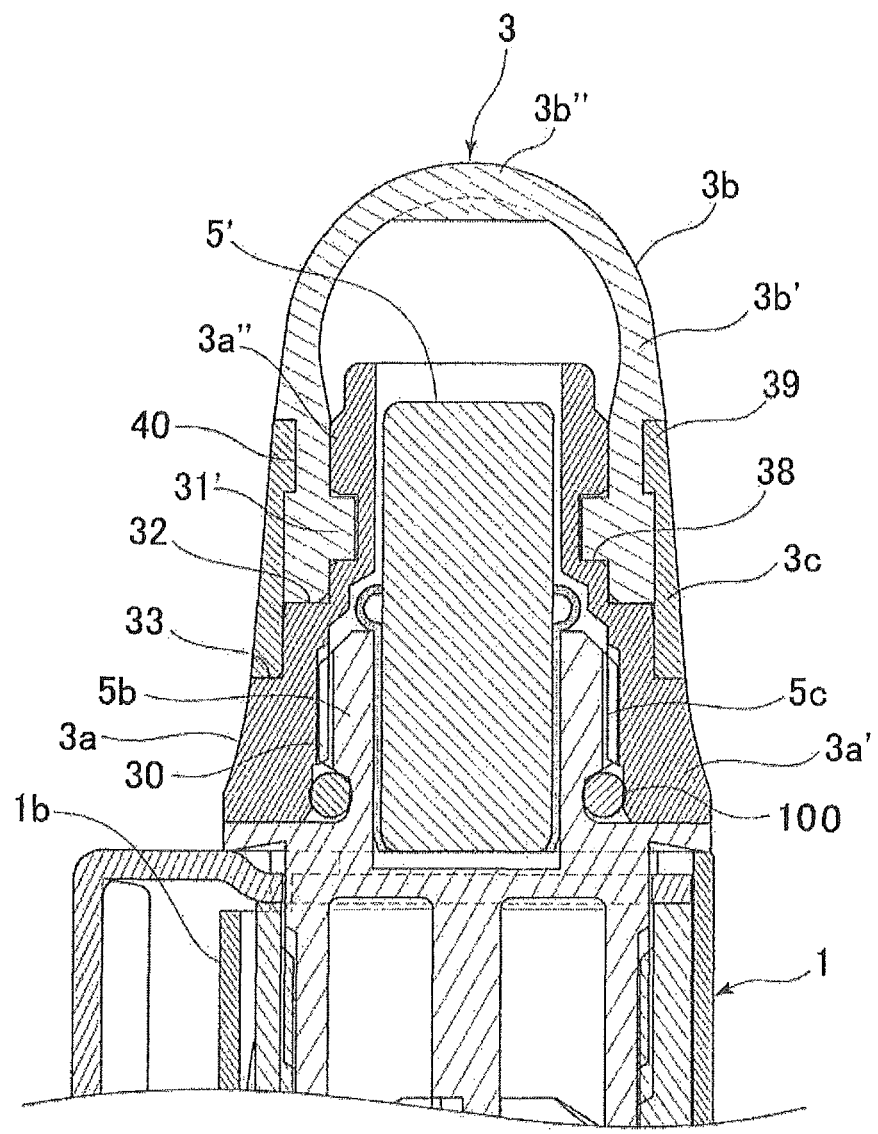
FIG. 5 is an enlarged sectional view illustrating a modification of the second embodiment.

Referring to FIG. 5, there is illustrated a modification of the second embodiment shown in FIG. 4. This modification is different from the embodiment shown in FIG. 4 in that the cooperation structure further includes an annular engagement portion 39 continuously extending around and protruding radially inward from the rear end portion of the stopper ring 3c, and a second annularly recessed portion 40 which is formed in a region of the outer peripheral surface of the peripheral wall portion 3b of the cover body 3b that positionally corresponds to the engagement portion 39 of the stopper ring 3c. Other elements of this modification are configured in the substantially same manner as those of the embodiment shown in FIG. 4 are done. Therefore, elements of the modification shown in FIG. 5 which are similar or identical to those of the embodiment shown in FIG. 4 are denoted by like reference signs and the description of them will not be repeated.

The rear end portion of the stopper ring 3c constitutes the engagement portion 39 which protrudes radially inward in a step form in the same manner as the engagement portion 34 of the first embodiment does. The second annularly recessed portion 40 is formed so as to continuously extend around the region of the outer peripheral surface of the peripheral wall portion 3b' of the cover body 3b in the rear of the inward facing flange 31', which positionally corresponds to the engagement portion 39. The second annularly recessed portion 40 and the engagement portion 39 have complementary shapes which allow them to be engaged with each other.

As discussed above, the second recessed portion 40 is formed in the region of the outer peripheral surface of the peripheral wall portion 3b' of the cover body 3b in the rear of the inward facing flange 31'. A size of a rear end surface of the second recessed portion 40 that is measured in the radial direction is set so as to be substantially equal to a size of the rear end surface of the stopper ring 3c that is measured in the radial direction.

In the modification shown in FIG. 5, the first recessed portion 38, the inward facing flange 31', the engagement portion 39, the second recessed portion 40, the first step portion 32, and the second step portion 33 constitute the cooperation structure.

In the modification shown in FIG. 5, the cover body 3b is fitted around the outer peripheral surface of the small diameter tubular portion 3a" of the cylindrical base 3a with the front end surface of the peripheral wall portion 3b' being engagedly stopped by the first step portion 32 of the cylindrical base 3a, and with the inward facing flange 31' being engagedly fitted in the first recessed portion 38. Moreover, the stopper ring 3c is fitted around the peripheral surface of the at least fitted portion between the cylindrical base 3a and the cover body 3b with the front end surface thereof being engagedly stopped by the second step portion 33, with the inner peripheral surface thereof being engaged with the outer peripheral surface of the peripheral wall portion 3b' of the cover body 3b and the outer peripheral surface of the large diameter tubular portion 3a' of the cylindrical base 3a, and with the engagement portion 39 being engagedly fitted in the second recessed portion 40. Thus, the cover body 3b, the cylindrical base 3a, and the stopper ring 3c are joined together to form the joined unit, so that the cover body 3b can be strongly held by the cylindrical base 3a and the stopper ring 3c via the cooperation structure. Moreover, the engagement portion 39 of the stopper ring 3c is engagedly fitted in the second recessed portion 40 of the cover body 3b, so that the holding force which is exerted on the cover body 3b in the radial direction and the direction oblique to the axial direction by the cylindrical base 3a and the stopper ring 3c can be more enhanced.

Moreover, in the modification shown in FIG. 5, the outer peripheral surface of the cover body 3b, the outer peripheral surface of the stopper ring 3c, and the outer peripheral surface of the cylindrical base 3a are configured so as to be flush with one another, thus making it possible to provide an end cover having a good visual appearance and, therefore, to enhance commercial value of the writing instrument.

Moreover, the engagement portion 39 of the stopper ring 3c is engagedly fitted in the second recessed portion 40 of the cover body 3b, and the rear end surface of the second recessed portion 40 of the cover body 3b which extends radially is engagedly stopped by the rear end surface of the engagement portion 34 of the stopper ring 3c, so that particularly in the case where the cover body 3b is formed of elastic material, it is possible to suppress deformation of the cover body 3b which may be brought about by repeated use of the cover body 3b. For example, in the case where the cover body 3b is formed of electrically conductive elastic material in order that the end cover 3 can be used as the pen tip of the touch pen, even if the cover body 3b is touched on the touch panel of the electronic appliance a great number of times, the deformation of the cover body 3b can be suppressed.

Third Embodiment

While the writing instruments of the first and second embodiments in which the end covers are attached to the rear end portions of the cylindrical barrels have described above, the present invention may be applied to a writing instrument provided with an end cover which functions as a cap covering a writing tip of a writing element. A writing instrument according to a third embodiment of the present invention which is provided with the end cover functioning as the cap which covers the writing tip of the writing element will be discussed hereinafter.

Figure 6:
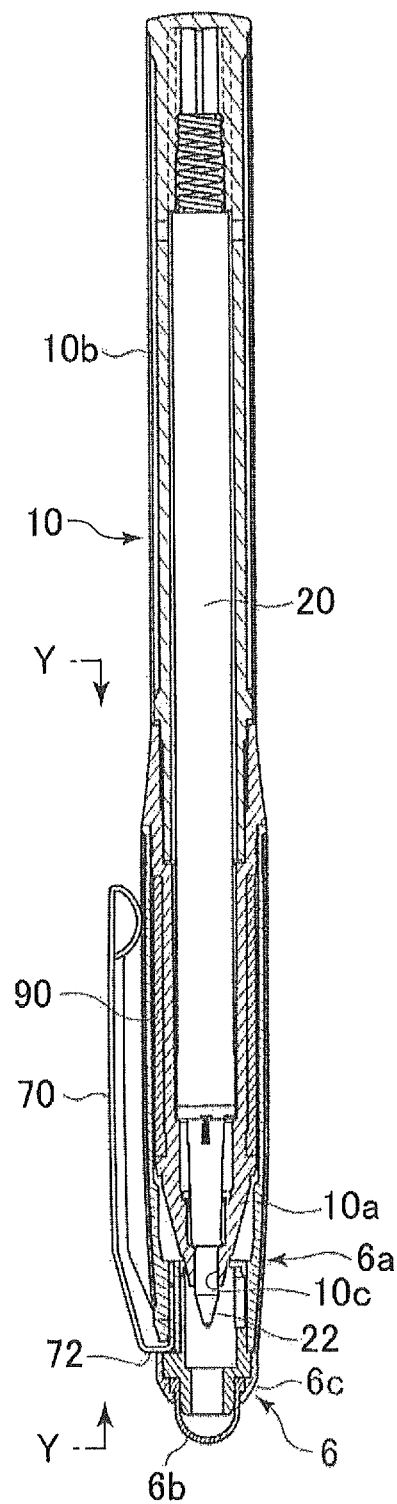
FIG. 6 is a vertically sectional view of an entire writing instrument according to a third embodiment of the present invention.
Figure 7:
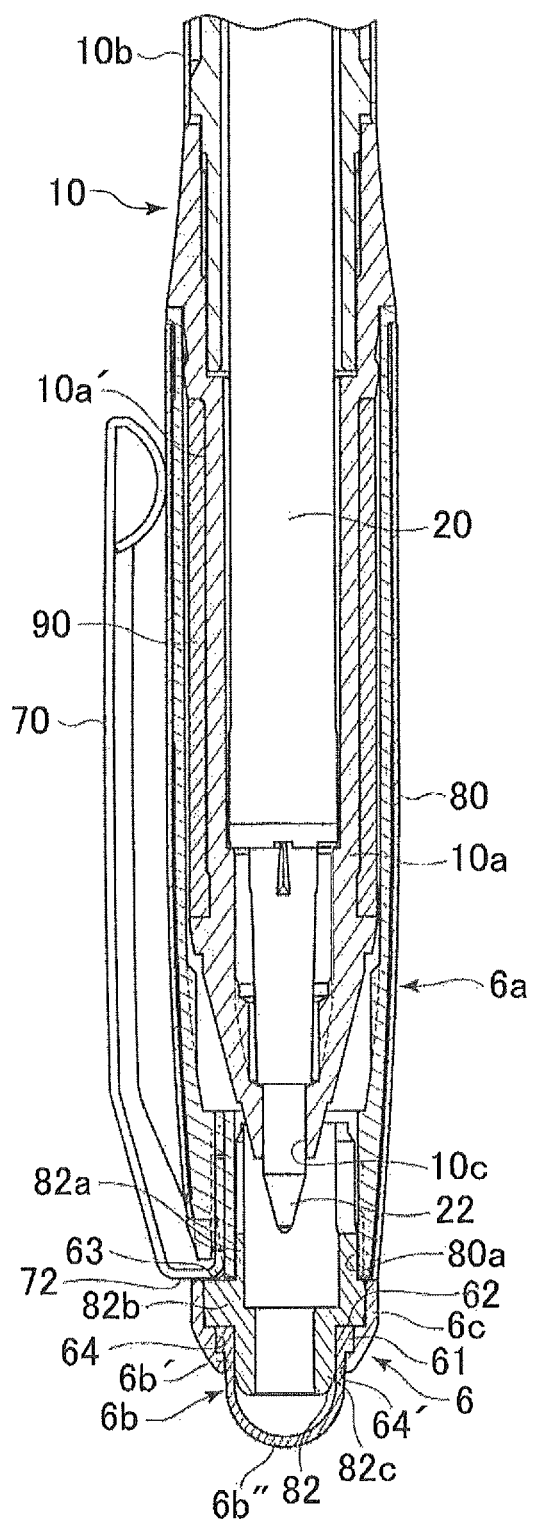
FIG. 7 is an enlarged sectional view which shows a portion of the writing instrument of the third embodiment of FIG. 6, taken along a line Y-Y in FIG. 6.

Referring now to FIGS. 6 and 7, the writing instrument according to the third embodiment has a cylindrical barrel 10 which comprises a front cylindrical barrel member 10a and a rear cylindrical barrel member 10b connected to the front cylindrical barrel member 10a. A refill for a ball-point pen is inserted in the cylindrical barrel 10 as a writing element 20. A writing tip 22 of the writing element 20 is protruded from an opening 10c which is formed at the front end of the front cylindrical barrel member 10a.

An end cover 6 which functions as a cap covering the writing tip 22 of the writing element 20 is detachably mounted around the front cylindrical barrel member 10a of the cylindrical barrel 10. As best shown in FIG. 7, the end cover 6 comprises a cylindrical base 6a detachably fitted around the front cylindrical barrel member 10a of the cylindrical barrel 1, a cover body 6b fitted around an outer peripheral surface of a front end portion of the cylindrical base 6a, a stopper ring 6c fitted around an outer peripheral surface of at least a fitted portion between the cylindrical base 6a and the cover body 6b, and a cooperation structure for enhancing a holding force which is exerted on the cover body 6b by the cylindrical base 6a and the stopper ring 6c and for joining the cylindrical base 6a, the cover body 6b, and the stopper ring 6c together to form a joined unit which comprises the cylindrical base 6a, the cover body 6b, and the stopper ring 6c. Thus, the end cover 6 can be configured so as to have a robust structure in which the cylindrical base 6a, the cover body 6b, and the stopper ring 6c are joined together to form the joined unit.

Unlike the cylindrical base of each of the first and second embodiments, the cylindrical base 6a of the third embodiment is assembled by two components, namely, a longitudinal cylindrical base body 80 opened in front and rear end portions thereof, and a base member 82 fixedly fitted in the opened front end portion of the cylindrical base body 80. A clip 70 is attached to the front end of the cylindrical base body 80 by hanging a root portion 72 of the clip 70 on the opened front end portion of the cylindrical base body 80. The base member 82 comprises an insertion portion 82a fitted in the opened front end portion 80a of the cylindrical base body 80, a large diameter portion 82b formed integrally with a front end of the insertion portion 82a so as to be increased in diameter relative to the insertion portion 82 and formed in a step form, and a small diameter portion 82c formed integrally with a front end of the large diameter portion 82b so as to be decreased in diameter relative to the large diameter portion 82b and formed in a step form. A front end surface of the large diameter portion 82b forms a first radially outward extending step portion 62. Moreover, a rear end surface of the large diameter portion 82b contacts a front end surface of the cylindrical base body 80 and the root portion 72 of the clip 70, to thereby form a second radially outward extending step portion 63 in cooperation with them. Incidentally, the rear end surface of the large diameter portion 82b of the base member 82 may contact the entire front end surface of the base member 82 without contacting the root portion 72 of the clip 70, to thereby form the second radially outward extending step portion 63 in cooperation with the entire front end surface of the cylindrical base body 80. In this case, a through-hole (not shown) is formed in a peripheral wall portion of the front end portion of the cylindrical base body 80 and the root portion 72 of the clip 70 is fitted through the through-hole, whereby the clip 70 is attached to the end cover 6.

The cover body 6b comprises a peripheral wall portion 6b' of a substantially cylindrical shape fitted around an outer peripheral surface of the small diameter portion 82c of the base member 82, a ceiling portion 6b" formed in a dome shape at a front end of the peripheral wall portion 6b', and an outward facing flange 61 protruding radially outwardly from a rear end portion of the peripheral wall portion 6b'. The outward facing flange 61 is formed as an annular flange continuously extending around an outer peripheral surface of the rear end portion of the peripheral wall portion 6b'.

The stopper ring 6c is an annular component, an outer diameter of a front end portion of which is reduced. Moreover, an inner diameter of a region extending from a rear end portion toward a middle portion of the stopper ring 6c is substantially constant, the middle portion of the stopper ring 6c is formed in a step form, to thereby form a first annular engagement portion 64 extending radially inward, and the front end portion of the stopper ring 6c is formed in a step form, to thereby form a second annular engagement portion 64' extending radially inward, so that inner diameters of the middle and front end portions of the stopper ring 6c are smaller than that of the region extending from the rear end portion toward the middle portion of the stopper ring 6c.

The cover body 6b is fitted around the outer peripheral surface of the front end portion of the base member 82 with a rear surface of the outward facing flange 61 being engagedly stopped by the first step portion 62 of the base member 82 and with an inner peripheral surface of the peripheral wall portion 6b' being engaged with the outer peripheral surface of the small diameter portion 82c of the base member 82. Moreover, the stopper ring 6c is fitted around the outer peripheral surface of the at least fitted portion between the base member 82 and the cover body 3b so as to be engaged with the outer peripheral surface of the large diameter portion 82b of the base member 82 and the outer peripheral surface of the peripheral wall portion 6b' of the cover body 6b, with a rear end surface thereof being engagedly stopped by the second step portion 63, and with the first engagement portion 64 and the second engagement portion 64' being engagedly stopped by the front end surface of the large diameter portion 82b of the base member 82 and the front end surface of the outward facing flange 61 of the cover body 6b, respectively. Thus, the cover body 6b, the cylindrical base 6a, and the stopper ring 6c are joined together to form the joined unit as discussed above. In the third embodiment, the outward facing flange 61, the first step portion 62, the second step portion 63, the first engagement portion 64, the second engagement portion 64' constitute the above-mentioned cooperation structure.

Incidentally, reference sign 90 in FIGS. 6 and 7 denotes an annular gripper which is to be gripped by a user when the user removes the end cover 6 from the cylindrical barrel 10 and then performs writing using the writing instrument. The annular gripper 90 is received within an annular recess portion 10a' formed around the front cylindrical barrel member 10a.

In the third embodiment configured as discussed above, holding force which is exerted on the cover body 6b by the cylindrical base 6a and the stopper ring 6c is enhanced by the cooperation structure. Therefore, the end cover 6 according to the third embodiment is configured as an end cover in which the cover body 6b, the cylindrical base 6a, and the stopper ring 6c are joined together and which has a robust structure. Particularly, in the case where the cover body 6b is formed of elastic material, the cover body 6b can be strongly held by the cylindrical base 6a and the stopper ring 6c via the cooperation structure. If the end cover 6 is formed of electrically conductive elastic material, the end cover 6 can be used as a pen tip of a touch pen in addition to being used as the cap covering the writing tip 22 of the writing element 20. Even in this case, there is no possibility that the cover body 6b will be accidentally removed from the cylindrical base 6a and the stopper ring 6c.

In the case where the end cap 6 is used as the pen tip of the touch pen, in this embodiment, the cylindrical base 6a and the stopper ring 6c are formed of metal material or electrically conductive hard-plastic material and, moreover, the front cylindrical barrel member 10a may be formed of, for example, plastic material with a metal-plated surface, and the rear cylindrical barrel member 10b may be formed of, for example, a material which comprises two layers, namely, an inner layer of plastic material or metal-plated plastic material and an outer layer of metal material positioned on an outer surface of the inner layer.

Modification of Third Embodiment

The technical concept of the present invention which is shown in FIG. 3 may be applied to the third embodiment. More particularly, like the cooperation structure of the example shown in FIG. 3, the cooperation structure of the third embodiment may include a third step portion (not shown) as well as the outward facing flange 61, the first step portion 62, the second step portion 63, the first engagement portion 64, and the second engagement portion 64'. The unshown third step portion extends radially outward from a region of the outer peripheral surface of the cover body 6b in the front of the outward facing flange 61 and defines a recess portion (not shown) in cooperation with the outward facing flange 61.

In the modification of the third embodiment, the cover body 6b is fitted around the cylindrical base 6a with the rear end surface of the outward facing flange 61 being engagedly stopped by the first step portion 62 of the base member 82 and with the inner peripheral surface of the peripheral wall portion 6b' being engaged with the outer peripheral surface of the small diameter portion 82c of the base member 82. Moreover, the stopper ring 6c is fitted around the outer peripheral surface of the at least fitted portion between the base member 82 and the cover body 6b with the rear end surface thereof being engagedly stopped by the second step portion 63, with the first engagement portion 64 being engaged with the outer peripheral surface of the small diameter portion 82c of the base member 82, and with the second engagement portion 64' being engagedly fitted in the unshown recess portion of the cover body 6b. Thus, the cover body 6b, the cylindrical base 6a, and the stopper ring 6c are joined together to form a joined unit.

Fourth Embodiment

As a fourth embodiment of the present invention, there may be employed an embodiment in which the technical concept of the present invention that is shown in FIG. 4 is applied to the third embodiment shown in FIGS. 6 and 7. More particularly, like the cover body of the embodiment shown in FIG. 4, the cover body 6b may be configured so as to include an inward facing flange (not shown). In this case, the cylindrical base 6a, more precisely, the small diameter portion 82c of the base member 82 of the cylindrical base 6a includes an annular recess portion (not shown). The unshown inward facing flange is formed as an annular flange which continuously extends around an inner peripheral surface of a portion of the cover body 6b that positionally corresponds to the unshown annular recessed portion of the small diameter portion 82c, and protrudes radially inward from the inner peripheral surface of the portion of the cover body 6b. In the fourth embodiment, the cover body 6b is fitted around the outer peripheral surface of the small diameter portion 82c of the base member 82 with the rear surface thereof being engagedly stopped by the first step portion 62 of the base member 82 and with the unshown inward facing flange being engagedly fitted in the unshown recess portion of the small diameter portion 82. Moreover, the stopper ring 6c is fitted around the outer peripheral surface of the at least fitted portion between the base member 82 of the cylindrical base 6a and the cover body 6b with the rear end surface thereof being engagedly stopped by the second step portion 63. Thus, the cover body 6b, the cylindrical base 6a, and the stopper ring 6c are joined together to form a joined unit. In this embodiment, the first step portion 62, the second step portion 63, the first engagement portion 64, the second engagement portion 64', the unshown annular recess portion of the small diameter portion 82c of the base member 82, and the unshown inward facing flange of the cover body 6b constitute the cooperation structure.

Modification of Fourth Embodiment

The technical concept of the present invention which is shown in FIG. 5 may be applied to the fourth embodiment. More particularly, like the cover body shown in FIG. 5, the cover body 6b may have a second annular recess portion (not shown) formed in a portion of the outer periphery thereof which positionally corresponds to the second engagement portion 64' of the stopper ring 6c. In this modification, the cover body 6b is fitted around the outer peripheral surface of the small diameter portion 82c of the base member 82 with the rear end surface thereof being engagedly stopped by the first step portion 62 and with the unshown inward facing flange being engagedly fitted in the first recess portion (not shown) of the small diameter portion 82c of the base member 82. Moreover, the stopper ring 6c is fitted around the at least fitted portion between the small diameter portion 82c of the base member 82 and the cover body 6b with the rear end surface thereof being engagedly stopped by the second step portion 63 and with the second engagement portion 64' being engagedly fitted in the second recess portion (not shown) of the cover body 6b. Thus, the cover body 6b, the cylindrical base 6a, and the stopper ring 6c are joined together to form a joined unit. Incidentally, in this modification, the first step portion 62, the second step portion 63, the unshown annular recess portion of the small diameter portion 82c of the base member 82, the first engagement portion 64, the second engagement portion 64', and the unshown inward facing flange of the cover body 6b constitute the cooperation structure.

Incidentally, although the present invention has been explained with reference to the specific embodiments, it is readily understood that the present invention is not limited to the embodiments and that various modifications and changes can be made by those skilled in the art without departing from the spirit and scope of the present invention.

REFERENCE SIGN LIST 1, 10 . . . Cylindrical barrel
1a, 10a . . . Front cylindrical barrel member
1b, 10b . . . Rear cylindrical barrel member
10, 10c . . . Opening
2 . . . Writing tip of writing element
3, 6 . . . End cover
3a, 6a . . . Cylindrical base
3a' . . . Large diameter tubular portion of cylindrical base
3a'' . . . Small diameter tubular portion of cylindrical base
3b, 6b . . . Cover body
3b', 6b' . . . Peripheral wall portion of cover body
3b'', 6b'' . . . Ceiling portion of cover body
3c, 6c . . . Stopper ring
4, 70 . . . Clip
5 . . . Large diameter eraser
5' . . . Small diameter eraser
5a . . . Eraser holder
5b . . . Eraser holder receiving portion
5c, 30 . . . Thread
10a' . . . Recess portion of front cylindrical barrel member
20 . . . Writing element
22 . . . Writing tip of writing element
31, 61 . . . Outward facing flange
32, 62 . . . Inward facing flange
32, 62 . . . First step portion
33, 63 . . . Second step portion
34, 39, 64, 64' . . . Engagement portion
36 . . . Knurling
37 . . . Third step portion
35, 38, 40 . . . Recessed portion
37 . . . Third step portion
70 . . . Clip
72 . . . Root portion of clip
80 . . . Cylindrical base body
80a . . . opened front end portion of cylindrical base body
82 . . . Base member
82a . . . Insertion portion of base member
82b . . . Large diameter portion of base member
82c . . . Small diameter portion of base member
90 . . . Gripper
100 . . . O-ring

What is claimed is:

1. A writing instrument comprising a cylindrical barrel and an end cover attached to a rear end portion of the cylindrical barrel, wherein the end cover comprises:
a cylindrical base mounted around the rear end portion of the cylindrical barrel;
a cover body fitted around an outer peripheral surface of a rear end portion of the cylindrical base;
a stopper ring fitted around an outer peripheral surface of at least a fitted portion between the cylindrical base and the cover body; and
a cooperation structure for enhancing a holding force which is exerted on the cover body by the cylindrical base and the stopper ring and for forming a joined unit which comprises the cylindrical base, the cover body and the stopper ring;
the cooperation structure comprising:
an outward facing flange protruding radially outward from a front end portion of the cover body;
a first step portion extending radially outward from an outer peripheral surface of a substantially middle portion of the cylindrical base in an axial direction of the cylindrical base;
an engagement portion protruding radially inward from a rear end portion of the stopper ring; and
a second step portion extending radially outward from an outer peripheral surface of a portion of the cylindrical base in front of the first step portion;
the cover body being fitted around the outer peripheral surface of the rear end portion of the cylindrical base with the outward facing flange being engagedly stopped by the first step portion; and
the stopper ring being fitted around the outer peripheral surface of the at least fitted portion between the cylindrical base and the cover body with a front end surface thereof being engagedly stopped by the second step portion, and with the engagement portion being engagedly stopped by a rear end surface of the outward facing flange and engaged with an outer peripheral surface of the cover body.

2. A writing instrument according to claim 1,
wherein the cooperation structure further includes a third step portion extending radially outward from an outer peripheral surface of a portion of the cover body in rear of the outward facing flange and defining a recessed portion in cooperation with the outward facing flange;
the cover body being fitted around the outer peripheral surface of the rear end portion of the cylindrical base with the outward facing flange being engagedly stopped by the first step portion; and
the stopper ring being fitted around the outer peripheral surface of the at least fitted portion between the cylindrical base and the cover body with the front end surface thereof being engagedly stopped by the second step portion, and with the engagement portion being engagedly fitted in the recessed portion.

3. A writing instrument comprising a cylindrical barrel and an end cover attached to a rear end portion of the cylindrical barrel, wherein the end cover comprises:
a cylindrical base mounted around the rear end portion of the cylindrical barrel;
a cover body fitted around an outer peripheral surface of a rear end portion of the cylindrical base;
a stopper ring fitted around an outer peripheral surface of at least a fitted portion between the cylindrical base and the cover body; and
a cooperation structure for enhancing a holding force which is exerted on the cover body by the cylindrical base and the stopper ring and for forming a joined unit which comprises the cylindrical base, the cover body and the stopper ring;
the cooperation structure comprising:
a first step portion extending radially outward from an outer peripheral surface of a substantially middle portion of the cylindrical base in an axial direction of the cylindrical base;
a recessed portion formed around an outer peripheral surface of a portion of the cylindrical base in rear of the first step portion;
a second step portion extending radially outward from an outer peripheral surface of a portion of the cylindrical base in front of the first step portion; and
an inward facing flange protruding radially inward from an inner peripheral surface of a portion of the cover body which positionally corresponds to the recessed portion;
the cover body being fitted around the outer peripheral surface of the rear end portion of the cylindrical base with a front end surface thereof being engagedly stopped by the first step portion, and with the inward facing flange being engagedly fitted in the recessed portion; and
the stopper ring being fitted around the outer peripheral surface of the at least fitted portion between the cylindrical base and the cover body with a front end surface thereof being engagedly stopped by the second step portion.

4. A wiring instrument according to claim 3, wherein the cooperation structure further includes an engagement portion protruding radially inward from a rear end portion of the stopper ring, and a second recessed portion formed around an outer peripheral surface of a portion of the cover body which positionally corresponds to the engagement portion;
the cover body being fitted around the outer peripheral surface of the rear end portion of the cylindrical base with the front end surface thereof being engagedly stopped by the first step portion, and with the inward facing flange being engagedly fitted in the first recessed portion; and
the stopper ring being fitted around the outer peripheral surface of the at least fitted portion between the cylindrical base and the cover body with the front end surface thereof being engagedly stopped by the second step portion, and with the engagement portion being engagedly fitted in the second recessed portion.

5. A wiring instrument according to claim 2, wherein the cylindrical base, the cover body, and the stopper ring are configured so as to be flush with one another in outer peripheries thereof.

6. A wiring instrument according to claim 4, wherein the cylindrical base, the cover body, and the stopper ring are configured so as to be flush with one another in outer peripheries thereof.

7. A wiring instrument according to claim 1,
wherein an interval between the cylindrical base and the stopper ring is made narrower than a thickness of a peripheral wall portion of the cover body.

8. A wiring instrument according to claim 2,
wherein an interval between the cylindrical base and the stopper ring is made narrower than a thickness of a peripheral wall portion of the cover body.

9. A wiring instrument according to claim 3,
wherein an interval between the cylindrical base and the stopper ring is made narrower than a thickness of a peripheral wall portion of the cover body.

10. A wiring instrument according to claim 4,
wherein an interval between the cylindrical base and the stopper ring is made narrower than a thickness of a peripheral wall portion of the cover body.

11. A writing instrument according to claim 1,
wherein a knurling is provided around an outer peripheral surface of the cylindrical base.

12. A writing instrument according to claim 1,
wherein the writing instrument further includes an eraser holder holding an eraser and the rear end portion of the cylindrical barrel is opened, the eraser holder being fitted in the open rear end portion of the cylindrical barrel, and the end cover is removably attached to the open rear end portion of the cylindrical barrel in a state where it covers the eraser held by the eraser holder.

13. A writing instrument according to claim 1,
wherein the cylindrical base and the stopper ring are formed of electrically conductive hard material, and the cover body is formed of electrically conductive elastic material.

14. A writing instrument according to claim 3,
wherein the cylindrical base and the stopper ring are formed of electrically conductive hard material, and the cover body is formed of electrically conductive elastic material.

15. A writing instrument according to claim 1,
wherein the cylindrical barrel, the cylindrical base, and the stopper ring are formed of electrically conductive hard material, the cover body is formed of electrically conductive elastic material, and an interval between the cylindrical base and the stopper ring is made narrower than a thickness of a peripheral wall portion of the cover body.

16. A writing instrument according to claim 3,
wherein the cylindrical barrel, the cylindrical base, and the stopper ring are formed of electrically conductive hard material, the cover body is formed of electrically conductive elastic material, and an interval between the cylindrical base and the stopper ring is made narrower than a thickness of a peripheral wall portion of the cover body.

17. A writing instrument according to claim 3, wherein a knurling is provided around an outer peripheral surface of the cylindrical base.

18. A writing instrument according to claim 3, wherein the writing instrument further includes an eraser holder holding an eraser and the rear end portion of the cylindrical barrel is opened, the eraser holder being fitted in the open rear end portion of the cylindrical barrel, and the end cover is removably attached to the open rear end portion of the cylindrical barrel in a state where it covers the eraser held by the eraser holder.

19. A writing instrument according to claim 1, wherein the cover body is formed of elastic material and an interval between the cylindrical base and the stopper ring is made narrower than a thickness of a peripheral wall portion of the cover body.

20. A writing instrument according to claim 3, wherein the cover body is formed of elastic material and an interval between the cylindrical base and the stopper ring is made narrower than a thickness of a peripheral wall portion of the cover body.

* * * * *